(12) United States Patent
Loy et al.

(10) Patent No.: US 8,905,878 B2
(45) Date of Patent: Dec. 9, 2014

(54) BICYCLE SPROCKET ASSEMBLY

(75) Inventors: Norman Loy, Queenstown (SG); Boon Keong Lim, Pasir Ris (SG)

(73) Assignee: Shimano (Singapore) PTE., Ltd., Jurong Town (SG)

( * ) Notice: Subject to any disclaimer, the term of this patent is extended or adjusted under 35 U.S.C. 154(b) by 501 days.

(21) Appl. No.: 13/015,681

(22) Filed: Jan. 28, 2011

(65) Prior Publication Data
US 2012/0196711 A1  Aug. 2, 2012

(51) Int. Cl.
F16H 55/12  (2006.01)
F16H 55/30  (2006.01)
B62M 9/10  (2006.01)

(52) U.S. Cl.
CPC ........................... B62M 9/10 (2013.01)
USPC .......................................... 474/160

(58) Field of Classification Search
CPC ............................................ B62M 9/10
USPC .......................................... 474/160
See application file for complete search history.

(56) References Cited

U.S. PATENT DOCUMENTS

| | | | | |
|---|---|---|---|---|
| 3,815,439 A * | 6/1974 | Tarutani | ........................ | 474/144 |
| 4,594,910 A * | 6/1986 | Nagano | ........................ | 74/594.2 |
| 5,194,051 A * | 3/1993 | Nagano | ........................ | 474/160 |
| 5,213,550 A * | 5/1993 | Wu | ........................ | 474/160 |
| 5,314,366 A * | 5/1994 | Palm | ........................ | 474/152 |
| 5,503,600 A * | 4/1996 | Berecz | ........................ | 474/160 |
| 5,935,034 A * | 8/1999 | Campagnolo | ........................ | 474/160 |
| 5,954,604 A * | 9/1999 | Nakamura | ........................ | 474/160 |
| 6,024,662 A * | 2/2000 | Fujimoto | ........................ | 474/144 |
| 6,102,821 A * | 8/2000 | Nakamura | ........................ | 474/160 |
| 6,176,798 B1 * | 1/2001 | Nakamura | ........................ | 474/160 |
| 6,428,437 B1 * | 8/2002 | Schlanger | ........................ | 474/160 |
| 6,488,603 B2 * | 12/2002 | Lim et al. | ........................ | 474/160 |
| 7,258,638 B2 * | 8/2007 | Valle | ........................ | 474/160 |
| 7,344,463 B2 * | 3/2008 | Reiter | ........................ | 474/160 |
| 7,585,240 B2 * | 9/2009 | Kamada | ........................ | 474/160 |
| 7,871,347 B2 * | 1/2011 | Kamada | ........................ | 474/160 |
| 7,967,709 B2 * | 6/2011 | Emura et al. | ........................ | 474/161 |
| 2004/0070166 A1 * | 4/2004 | Valle | ........................ | 280/260 |
| 2004/0121867 A1 * | 6/2004 | Reiter | ........................ | 474/160 |
| 2005/0090349 A1 * | 4/2005 | Lee | ........................ | 474/160 |
| 2006/0172840 A1 * | 8/2006 | Kamada | ........................ | 474/152 |
| 2009/0098966 A1 * | 4/2009 | Kamada | ........................ | 474/160 |

* cited by examiner

Primary Examiner — Henry Liu

(57) ABSTRACT

A bicycle sprocket assembly is provided with at least a first sprocket and a first axial spacer. The first sprocket includes a first sprocket mounting portion, a plurality of first sprocket arms extending radially from the first sprocket mounting portion and a first chain engaging portion disposed on radial outer ends of the first sprocket arms. The first chain engaging portion includes a plurality of first teeth. The first axial spacer is disposed on a first sprocket side surface of the first sprocket. The first axial spacer has a first spacer mounting portion and a plurality of first spacer arms extending radially from the first spacer mounting portion. The first spacer arms are partially visible from an axial view of a second sprocket side surface that faces in an opposite direction from the first sprocket side surface.

21 Claims, 7 Drawing Sheets

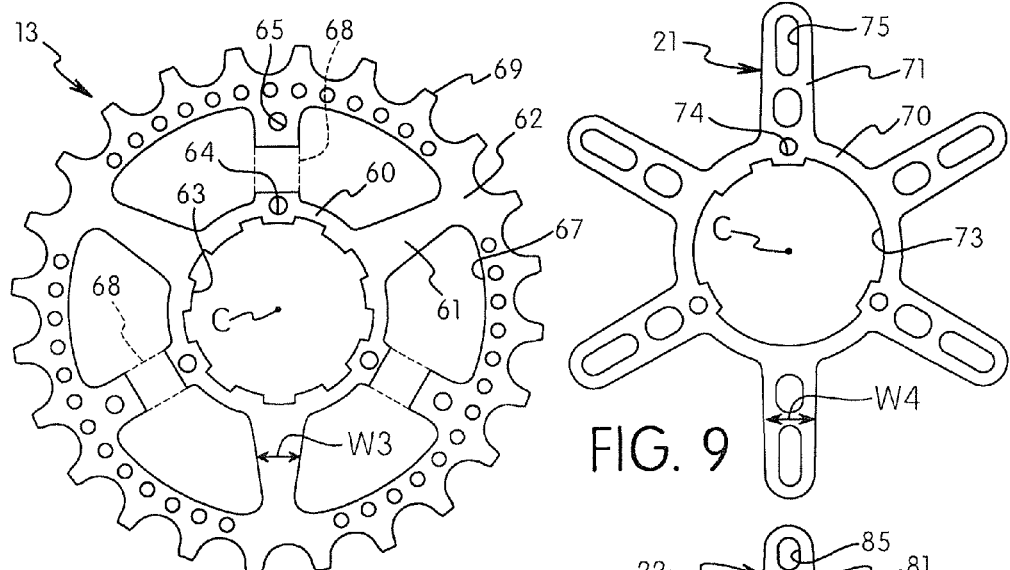
FIG. 8
FIG. 9
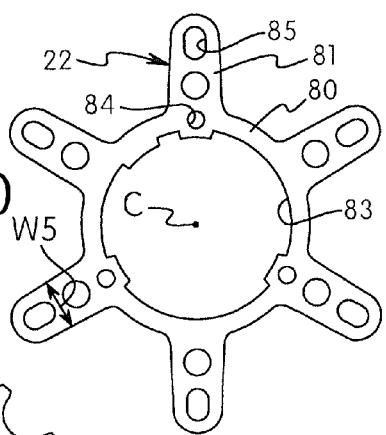
FIG. 10
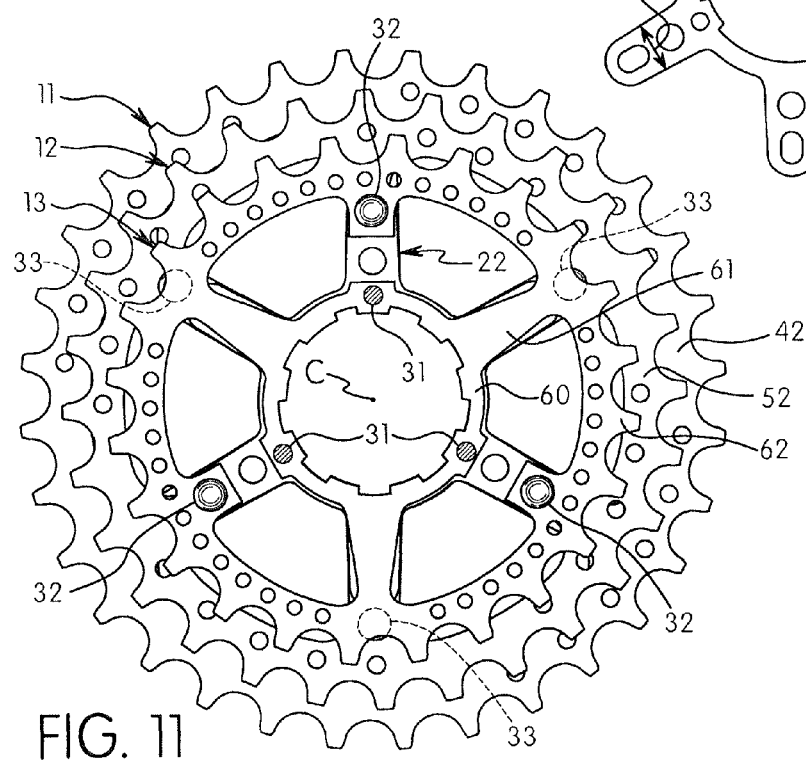
FIG. 11

BICYCLE SPROCKET ASSEMBLY

BACKGROUND OF THE INVENTION

1. Field of the Invention

This invention generally relates to a sprocket assembly for a bicycle. More specifically, the present invention relates a sprocket assembly that is lightweight relative to conventional designs.

2. Background Information

In recent years, bicycle component manufacturers have been manufacturing bicycle transmissions that have more available speeds to the rider. As the available speeds in the bicycle transmission increases, the number of sprockets installed on the rear wheel also usually increases. As a result, the weight of the bicycle has increased. Thus, there is a desire to reduce the weight of the bicycle. In other words, in pursuit of a faster riding speed, it is desirable to reduce the weight of all kinds of parts of the bicycle.

Various attempts have been made in order to reduce the weight of a multiple sprocket assembly. For example, some multiple sprocket assemblies use a spider (sprocket support), which supports a plurality of ring-shaped sprocket wheels. By using a spider, a light metal such as aluminum, etc., is generally used for the spider, while various types of steel materials are used for the sprockets to provide adequate strength. One example of a multiple sprocket assembly that uses a spider is disclosed in U.S. Pat. No. 6,102,821 (assigned to Shimano Inc.). While this construction reduces the overall weight of the sprocket assembly, it requires a pair of special spiders to be manufactured.

SUMMARY

One object of the present invention is to provide a bicycle sprocket assembly that is lightweight relative to conventional designs without sacrificing rigidity.

The foregoing objects can basically be attained by providing a bicycle sprocket assembly that at least comprises a first sprocket and a first axial spacer. The first sprocket includes a first sprocket mounting portion, a plurality of first sprocket arms extending radially from the first sprocket mounting portion and a first chain engaging portion disposed on radial outer ends of the first sprocket arms. The first chain engaging portion includes a plurality of first teeth. The first axial spacer is disposed on a first sprocket side surface of the first sprocket. The first axial spacer has a first spacer mounting portion and a plurality of first spacer arms extending radially from the first spacer mounting portion. The first spacer arms are partially visible from an axial view of a second sprocket side surface that faces in an opposite direction from the first sprocket side surface.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 8 is a side elevational view of the third sprocket (the sprocket that is two sprockets away from the largest sprocket) of the bicycle sprocket assembly illustrated in FIGS. 1 to 5 as viewed from the small sprocket facing side of the sprocket;

FIG. 9 is a side elevational view of the first axial spacer of the bicycle sprocket assembly illustrated in FIGS. 1 to 5 as viewed from the small sprocket facing side of the first axial spacer; and FIG. 10 is a side elevational view of the second axial spacer of the bicycle sprocket assembly illustrated in FIGS. 1 to 5 as viewed from the small sprocket facing side of the second axial spacer;

FIG. 11 is a side elevational view of the three largest sprockets and the first and second axial spacers of the bicycle sprocket assembly illustrated in FIGS. 1 to 5 as viewed from the small sprocket facing side of the sprockets;

DETAILED DESCRIPTION OF THE PREFERRED EMBODIMENTS

Figures 1, 2:
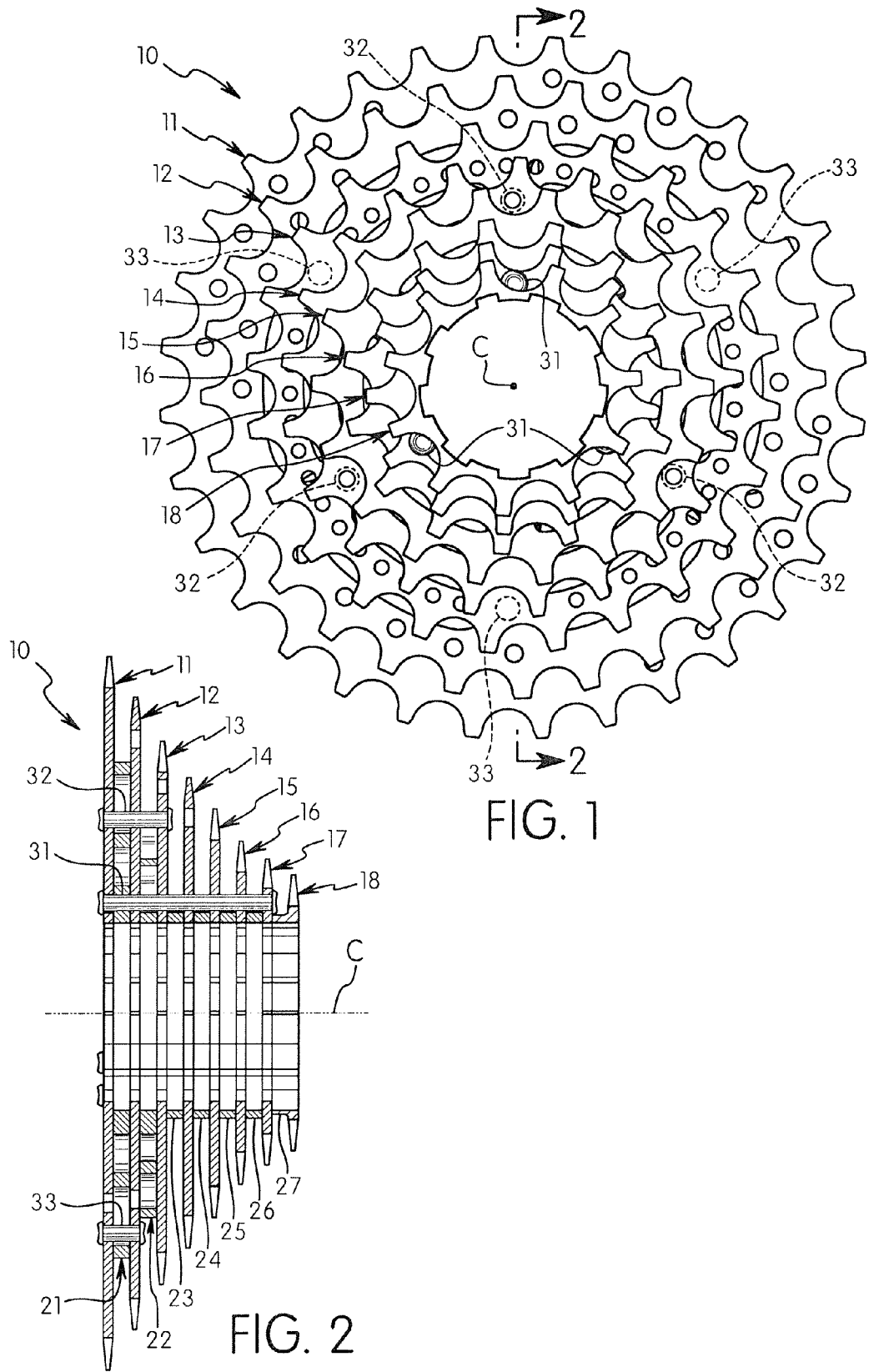
FIG. 1 is a side elevational view of an eight-stage bicycle sprocket assembly in accordance with one illustrated embodiment.
FIG. 2 is a cross sectional view of the bicycle sprocket assembly as seen along section line 2-2 of FIG. 1.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1 to 4, a rear multi-stage bicycle sprocket assembly 10 is illustrated in accordance with a first embodiment. In the illustrated embodiment, the bicycle sprocket assembly 10 includes a plurality of sprockets 11 to 18. The sprockets 11 to 18 are configured to be fixedly mounted on a freewheel (not shown) of a rear hub (not shown) in a relatively conventional manner such that the sprockets 11 to 18 rotate together about a center rotational axis C. The sprockets 11 to 18 typically rotate together in a clockwise direction as viewed in FIG. 1 (e.g., in a forward rotational direction) when the rider is pedaling in a forward (clockwise) direction to propel the bicycle in a forward direction. For the sake of clarity, the sprockets 11 to 18 will be referred to as first, second, third, fourth, fifth, sixth, seventh and eighth sprockets, respectively. The first sprocket 11 is the largest sprocket of the bicycle sprocket assembly 10 with a largest maximum diameter in the bicycle sprocket assembly 10. On the other hand, the eighth sprocket 18 is the smallest sprocket of the bicycle sprocket assembly 10 with a smallest maximum diameter in the bicycle sprocket assembly 10. In this disclosure, the fourth, fifth, sixth, seventh and eighth sprockets 14 to 18 are additional sprockets that are smaller than the first, second and third sprockets 11 to 13, which are the three largest sprockets of the bicycle sprocket assembly 10.

In the illustrated embodiment, the bicycle sprocket assembly 10 further includes a plurality of axial spacers 21 to 26 for axially spacing the sprockets 11 to 17. Thus, the sprockets 11 to 18 are axially spaced from each other at predetermined intervals by the thickness of the axial spacers 21 to 26. The axial spacers 21 to 26 are each a one-piece, unitary member that is made of a suitable rigid, lightweight materials. For example, the axial spacers 21 to 26 can be made of rigid resin materials or lightweight metallic materials such as aluminum. Preferably at least the axial spacers 21 and 22 are made of a rigid resin material. For the sake of clarity, the axial spacers 21 to 26 will be referred to as first, second, third, fourth, fifth and sixth axial spacers, respectively. Moreover, each of the sprockets 11 to 18 has a first sprocket side surface and a second sprocket side surface. In the illustrated embodiment, the first sprocket side surface refers to the sprocket side that faces towards the smaller sprocket(s), while the second sprocket side surface refers to the sprocket side that faces towards the larger sprocket(s).

The first axial spacer 21 is disposed between the first and second sprockets 11 and 12 for providing the appropriate axial spacing therebetween. Thus, the first axial spacer 21 is disposed on the first sprocket side surface of the first sprocket 11, which faces the second sprocket 12, and is disposed on the second sprocket side surface of the second sprocket 12, which faces the first sprocket 11. The second axial spacer 22 is disposed between the second and third sprockets 12 and 13 for providing the appropriate axial spacing therebetween. The third axial spacer 23 is disposed between the third and fourth sprockets 13 and 14 for providing the appropriate axial spacing therebetween. The fourth axial spacer 24 is disposed between the fourth and fifth sprockets 14 and 15 for providing the appropriate axial spacing therebetween. The fifth axial spacer 25 is disposed between the fifth and sixth sprockets 15 and 16 for providing the appropriate axial spacing therebetween. The sixth axial spacer 26 is disposed between the sixth and seventh sprockets 16 and 17 for providing the appropriate axial spacing therebetween. The eighth sprocket 18 includes an integrated spacer 27 for axially spacing the seventh sprocket 17 from the eighth sprocket 18 at the appropriate axial spacing therebetween.

Figure 3:
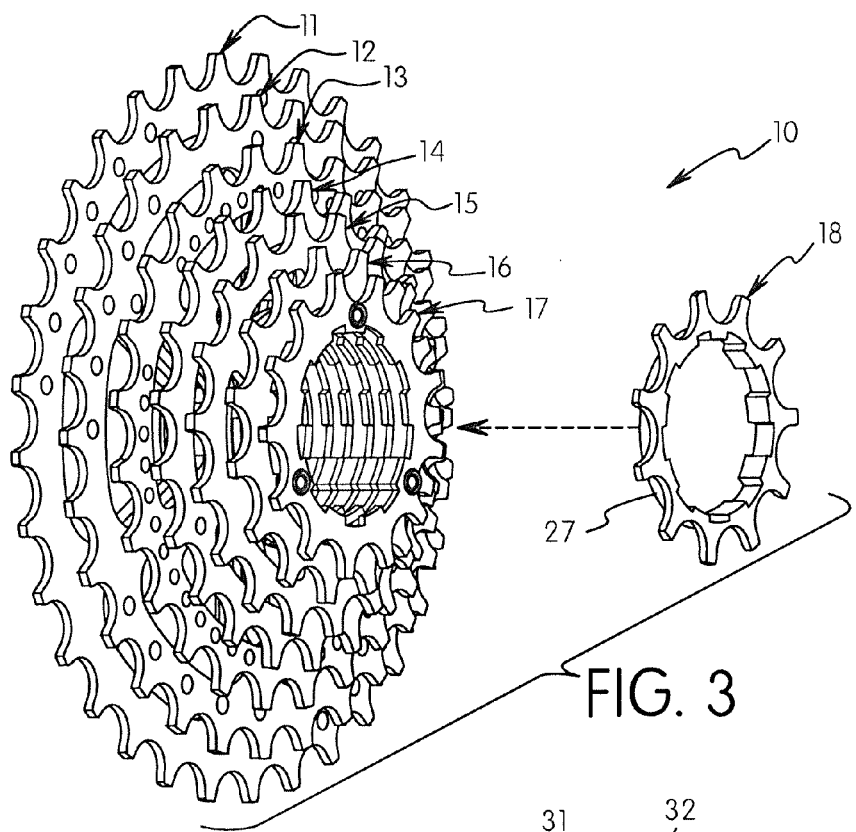
FIG. 3 is a partially exploded perspective view of the bicycle sprocket assembly illustrated in FIGS. 1 and 2.
Figure 4:
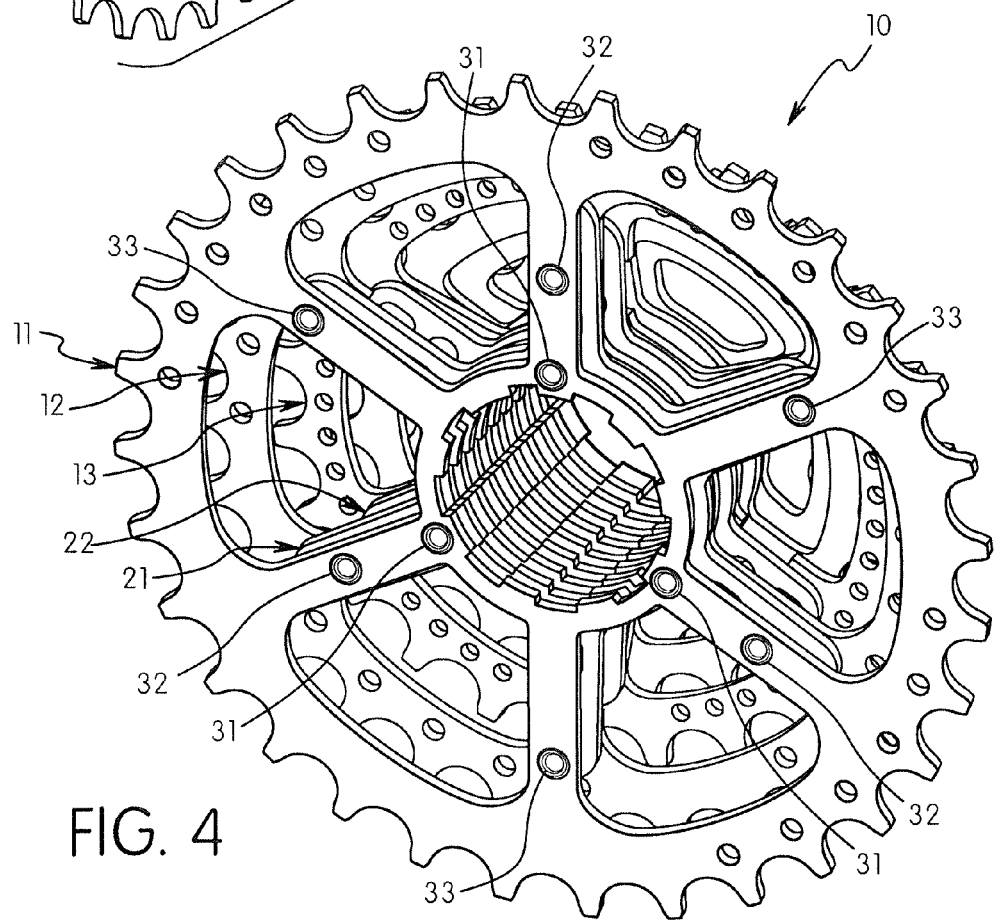
FIG. 4 is a perspective view of the bicycle sprocket assembly illustrated in FIGS. 1 to 3 as viewed from the large sprocket facing side of the sprockets.

As best seen in FIGS. 2 to 4, in the illustrated embodiment, the bicycle sprocket assembly 10 further includes a plurality of radially inner rivets or fasteners 31, a plurality of radially middle rivets or fasteners 32 and a plurality of radially outer rivets or fasteners 33. The radially inner rivets 31 secure the sprockets 11 to 17 and the axial spacers 21 to 26 together as a unit, while the radially middle rivets 32 and the radially outer rivets 33 are only connected to a few of the sprockets 11 to 17. More particularly, the radially inner rivets 31 extend through each of the sprockets 11 to 17, as discussed below. On the other hand, the radially middle rivets 32 only extend through the sprockets 11 to 13 and the radially outer rivets 33 only extend through the sprockets 11 and 12, as discussed below.

Figure 5:
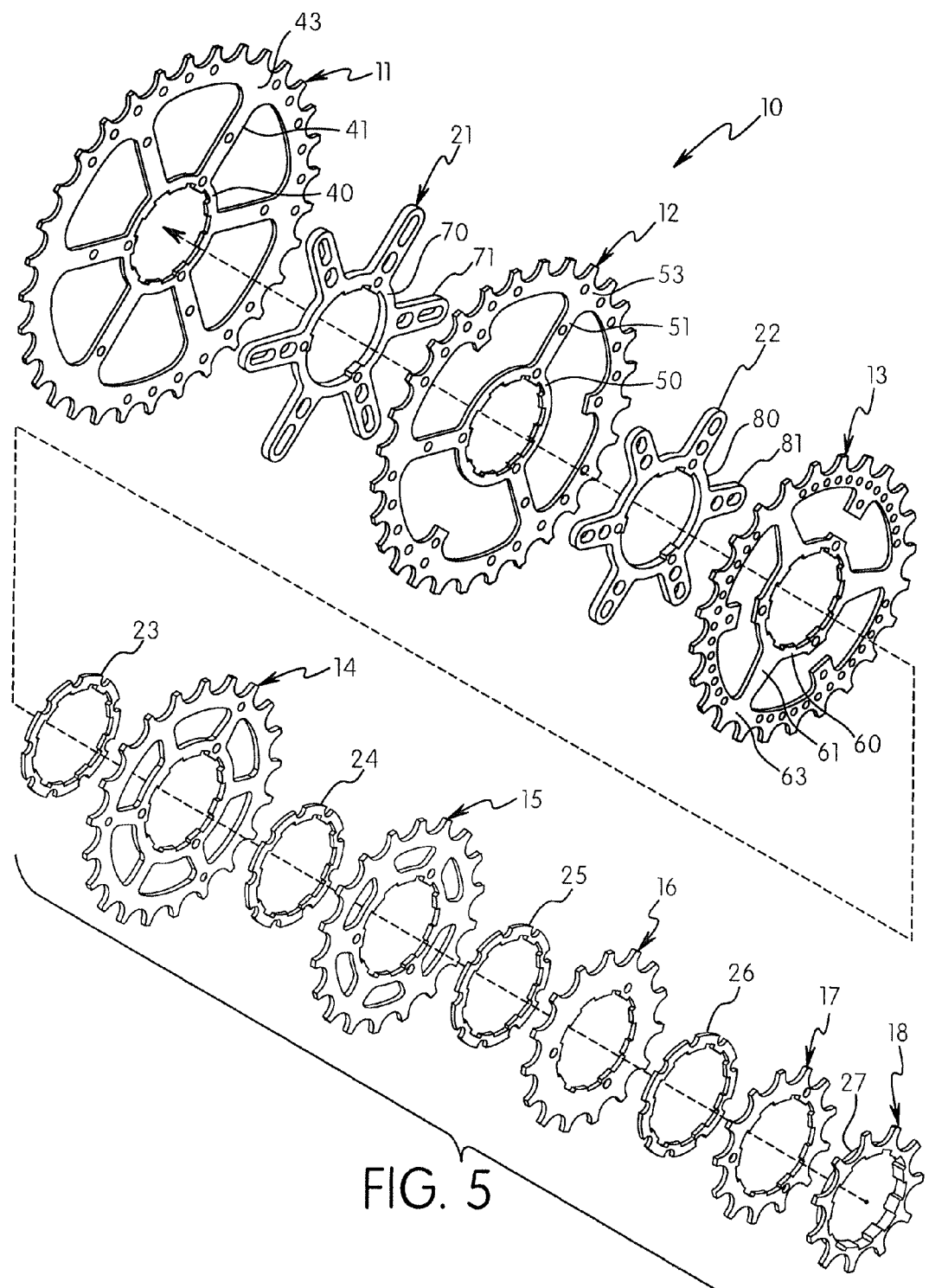
FIG. 5 is a fully exploded perspective view of the bicycle sprocket assembly illustrated in FIGS. 1 to 4.

As best seen in FIG. 5, in the illustrated embodiment, the bicycle sprocket assembly 10 is illustrated with a total of eight sprockets. However, it will be apparent to those skilled in the bicycle component field from this disclosure that the bicycle sprocket assembly 10 can have fewer or more sprockets as needed and/or desired. In other words, the sprocket assembly 10 can be any multi-stage sprocket assembly for a bicycle that uses a derailleur or the like and which includes at least one large sprocket and at least one small sprocket. In the illustrated embodiment, the sprockets 11 to 18 have the following teeth configuration from the largest sprocket 11 to the smallest sprocket 18: 32T-28T-24T-21T-18T-15T-13T-11T. Of course, the bicycle sprocket assembly 10 is not limited to this particular teeth configuration.

As seen in FIGS. 1 to 5, the sprockets 11 to 18 are hard, rigid disc shaped members formed from a suitable material such as a metallic material. In the illustrated embodiment, the sprockets 11 to 18 are each formed as a one-piece, unitary member from a metallic material that is suitable for a bicycle sprocket such as an iron or an iron alloy. The sprockets 11 to 18 are illustrated as plain sprockets. However, as needed and/or desired, the sprockets 11 to 18 can have specially configured teeth and/or various shift aiding structures that aid in performing an upshifting operation from a larger diameter sprocket to a smaller diameter sprocket and/or a downshifting operation from a smaller diameter sprocket to a larger diameter sprocket.

The axial thicknesses of the sprockets 11 to 18 and the axial spacings between the sprockets 11 to 18 will vary depending on the particular the drive train design. As seen in FIG. 2, for example, the sprocket body of the first sprocket 11 has a thickness of about 1.76 millimeters, while the sprocket bodies of the second to sixth sprockets 12 to 16 each have a thickness of about 1.7 millimeters. Also for example, the first spacer 21 has a thickness of about 3.1 millimeters, while the second to fifth spacers 22 to 25 each have a thickness of about 3.13 millimeters. In the illustrated embodiment, for example, the sprocket body of the seventh sprocket 17 has a thickness of about 1.95 millimeters, while the sixth spacer 26 has a thickness of about 3.28 millimeters. The eighth sprocket 18 includes the integrated spacer 27 such that the sprocket body of the eighth sprocket 18 has, for example, a thickness of about 5.25 millimeters.

Referring to FIG. 5, the first and third sprockets 11 to 13 are configured to be lighter than conventional sprockets of the same size due to the sprocket-arm shape design of each sprocket and the spacer-arm shape design of the axial spacers 21 and 22. On the other hand, the sprockets 14 to 18 are conventional sprockets and the axial spacers 23 to 26 are conventional ring shaped axial spacers. Since the sprockets 14 to 18 and the axial spacers 23 to 26 are conventional, the sprockets 14 to 18 and the axial spacers 23 to 26 will not be discussed in detail herein. Rather, the following disclosure will focus on the first and third sprockets 11 to 13 and the axial spacers 21 and 22.

Figure 6:
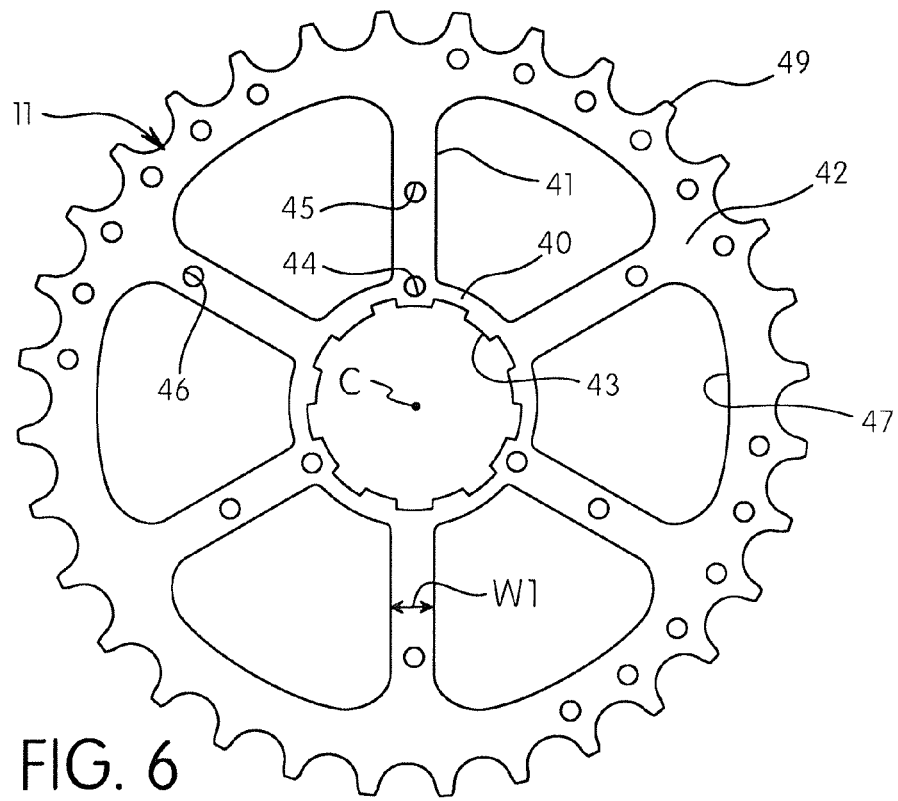
FIG. 6 is a side elevational view of the largest sprocket of the bicycle sprocket assembly illustrated in FIGS. 1 to 5 as viewed from the small sprocket facing side of the sprocket.

As best seen in FIG. 6, the first sprocket 11 includes a first sprocket mounting portion 40, a plurality of first sprocket arms 41 extending radially from the first sprocket mounting portion 40 and a first chain engaging portion 42 disposed on radial outer ends of the first sprocket arms 41. In the case of the first sprocket 11, the first sprocket arms 41 are preferably integrally formed with the first sprocket mounting portion 40 and the first chain engaging portion 42 as a one-piece, unitary member.

The first sprocket mounting portion 40 has a splined opening 43 for mounting on rear hub (not shown) and three fastener receiving holes 44 for receiving the inner rivets 31, respectively. The splined opening 43 is configured to be fixedly mounted on splines of a freewheel (not shown) of a rear hub (not shown) in a relatively conventional manner. Preferably, the splined opening 43 is configured so that the first sprocket 11 can only fit on the freewheel (not shown) in a single orientation. The splined opening 43 defines an inner periphery of the first sprocket mounting portion 40.

Each of the first sprocket arms 41 has a circumferential width or dimension W1 along a majority of its length from the first sprocket mounting portion 40 to the first chain engaging portion 42. Three of the first sprocket arms 41 has a hole 45 for receiving the middle rivets 32, respectively. Each of the remaining other three of the first sprocket arms 41 has a hole 46 for receiving one of the outer rivets 33, respectively. The first sprocket 11 includes six of the first sprocket arms 41, which are equally spaced apart in a circumferential direction about the center rotational axis C. However, the total number of the first sprocket arms 41 can be fewer or more than six as needed and/or desired. The first sprocket arms 41 extend in a radial direction between the first sprocket mounting portion 40 and the first chain engaging portion 42 so that a plurality of sprocket openings 47 are formed between the adjacent sprocket arms 41. These sprocket openings 47 aid in reducing the overall weight of the first sprocket 11.

The first chain engaging portion 42 includes a plurality of first teeth 49 on its outer peripheral edge for engaging a chain (not shown) in a conventional manner. The inner peripheral edge of the first chain engaging portion 42 is connected to the outer ends of the first sprocket arms 41. Since the first sprocket 11 is the largest sprocket of the bicycle sprocket assembly 10, the total number of the first teeth 49 is greater than the other sprockets 12 to 18 of the bicycle sprocket assembly 10. As mentioned above, the total number of the first teeth 49 in this illustrated embodiment is thirty-two.

Figure 7:
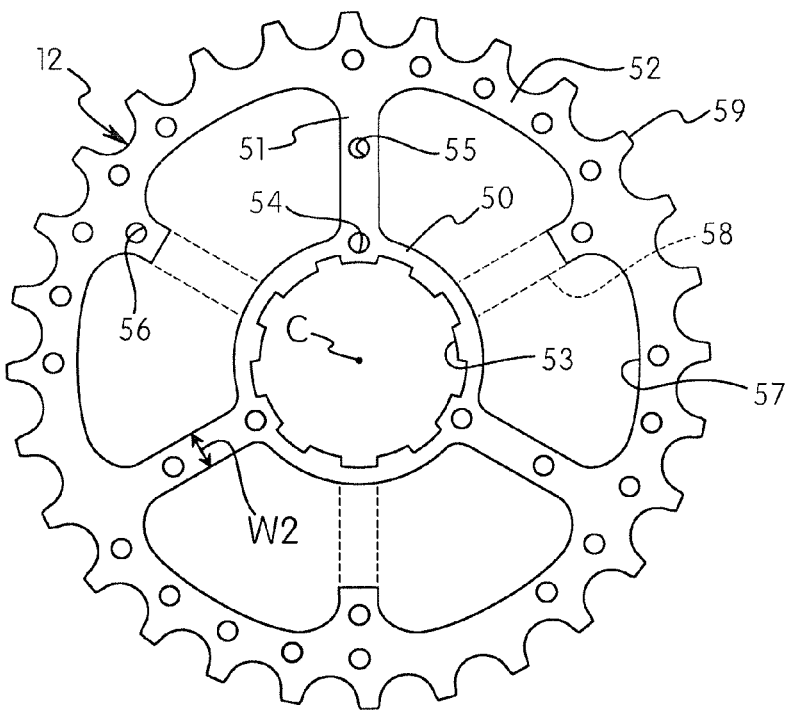
FIG. 7 is a side elevational view of the second sprocket (the sprocket next to the largest sprocket) of the bicycle sprocket assembly illustrated in FIGS. 1 to 5 as viewed from the small sprocket facing side of the sprocket.

As best seen in FIG. 7, the second sprocket 12 includes a second sprocket mounting portion 50, a plurality of second sprocket arms 51 extending radially from the second sprocket mounting portion 50 and a second chain engaging portion 52 disposed on radial outer ends of the second sprocket arms 51. In the case of the second sprocket 12, the second sprocket arms 51 are preferably integrally formed with the second sprocket mounting portion 50 and the second chain engaging portion 52 as a one-piece, unitary member.

The second sprocket mounting portion 50 has a splined opening 53 for mounting on rear hub (not shown) and three fastener receiving holes 54 for receiving the inner rivets 31, respectively. The splined opening 53 is configured to be fixedly mounted on splines of a freewheel (not shown) of a rear hub (not shown) in a relatively conventional manner. Preferably, the splined opening 53 is configured so that the second sprocket 12 can only fit on the freewheel (not shown) in a single orientation. The splined opening 53 defines an inner periphery of the second sprocket mounting portion 50.

Each of the second sprocket arms 51 has a circumferential width or dimension W2 along a majority of its length from the second sprocket mounting portion 50 to the second chain engaging portion 52. Each of the second sprocket arms 51 has a fastener receiving hole 55 for receiving the middle rivets 32, respectively. The second chain engaging portion 52 has three fastener receiving holes 56 for receiving the outer rivets 33. Thus, in addition to the rivets 31, the first and second sprockets 11 and 12 are further secured together by the rivets 32 and 33.

The second sprocket arms 51 extend in a radial direction between the second sprocket mounting portion 50 and the second chain engaging portion 52 so that a plurality of sprocket openings 57 are formed between the adjacent sprocket arms 51. These sprocket openings 57 aid in reducing the overall weight of the second sprocket 12. The total number (e.g., three) of the second sprocket arms 51 of the second sprocket 12 is less than the total number (e.g., six) of the first sprocket arms 41 of the first sprocket 11 so that the second sprocket 12 has at least one missing-arm portions 58 (more preferably a plurality of the missing-arm portions 58). The second sprocket arms 51 and the missing-arm portions 58 of the second sprocket 12 preferably alternate with respect to each other in a circumferential direction of the bicycle sprocket assembly 10.

Preferably, each of the second sprocket arms 51 is aligned with a corresponding one of the first sprocket arms 41 of the first sprocket 11. Also each of the missing-arm portions 58 is aligned with a corresponding one of the first sprocket arms 41 of the first sprocket 11. Thus, as used herein a "missing-arm portion" refers to an open area of a sprocket that aligns with a radial sprocket arm of the next largest sprocket that is the immediately adjacent sprocket to the sprocket with the "missing-arm portion" of the smaller sprocket. Forming such a missing-arm portion results in attaining weight-reduction of a sprocket.

The inner peripheral edge of the second chain engaging portion 52 is connected to the outer ends of the second sprocket arms 51. The inner peripheral edge of the second chain engaging portion 52 also includes three projections extending radially inward. Each of the projections of the second chain engaging portion 52 has a fastener receiving hole 56 for receiving one of the outer rivets 33, respectively. The second chain engaging portion 52 also includes a plurality of second teeth 59 on its outer peripheral edge for engaging a chain (not shown) in a conventional manner. The second chain engaging portion 52 has a total number (e.g., twenty-eight) of the second teeth 59 that is less than a total number (e.g., thirty-two) of the first teeth 49.

As best seen in FIG. 8, the third sprocket 13 includes a third sprocket mounting portion 60, a plurality of third sprocket arms 61 extending radially from the third sprocket mounting portion 60 and a third chain engaging portion 62 disposed on radial outer ends of the third sprocket arms 61. In the case of the third sprocket 13, the third sprocket arms 61 are preferably integrally formed with the third sprocket mounting portion 60 and the third chain engaging portion 62 as a one-piece, unitary member.

The third sprocket mounting portion 60 has a splined opening 63 for mounting on rear hub (not shown) and three fastener receiving holes 64 for receiving the inner rivets 31, respectively. The splined opening 63 is configured to be fixedly mounted on splines of a freewheel (not shown) of a rear hub (not shown) in a relatively conventional manner. Preferably, the splined opening 63 is configured so that the third sprocket 13 can only fit on the freewheel (not shown) in a single orientation. The splined opening 63 defines an inner periphery of the third sprocket mounting portion 60.

The inner peripheral edge of the third chain engaging portion 62 is connected to the outer ends of the third sprocket arms 61. The inner peripheral edge of the third chain engaging portion 62 also includes three projections extending radially inward. Each of the projections of the third chain engaging portion 62 has a fastener receiving hole 65 for receiving one of the middle rivets 32, respectively. Thus, in addition to the rivets 31, the third sprocket 13 is further secured to the first and second sprockets 11 and 12 together by the middle rivets 32.

Each of the third sprocket arms 61 has a circumferential width or dimension W3 that gets progressively smaller as the third sprocket arms 61 approach the third chain engaging portion 62 as seen in FIG. 8. In this illustrated embodiment, the total number (e.g., three) of the third sprocket arms 61 is equal to the total number (e.g., three) of the second sprocket arms 51 of the second sprocket 12 and is less than the total number six) of the first sprocket arms 41 of the first sprocket 11. The third sprocket arms 61 extend in a radial direction between the third sprocket mounting portion 60 and the third chain engaging portion 62 so that a plurality of sprocket openings 67 are formed between the adjacent sprocket arms 61. These sprocket openings 67 aid in reducing the overall weight of the third sprocket 13.

In this illustrated embodiment, each of the third sprocket arms 61 is aligned with a corresponding one of the first sprocket arms 41 of the first sprocket 11 and offset from the second sprocket arm 51 of the second sprocket 12 in the assembled state. Since the total number (e.g., three) of the third sprocket arms 61 is less than the total number (e.g., six) of the first sprocket arms 41 of the first sprocket 11 and is equal to the total number (e.g., three) of the second sprocket arms 51 of the second sprocket 12, the third sprocket 13 has at least one missing-arm portions 68 (more preferably a plurality of missing-arm portions 68). The third sprocket arms 61 and the missing-arm portions 68 of the third sprocket 13 preferably alternate with respect to each other in the circumferential direction of the bicycle sprocket assembly 10.

In this illustrated embodiment, the missing-arm portions 68 are open areas that are aligned with the second sprocket arm 51 of the second sprocket 12 in the assembled state. In other words, each of the missing-arm portions 68 of the third sprocket 13 is aligned with a corresponding one of second sprocket arms 51 of the second sprocket 12 in the assembled state and is also aligned with a corresponding one of the first sprocket arms 41 of the first sprocket 11 in the assembled state. Such arrangement of the missing-arm portions 68 can avoid sacrificing rigidity while effectively attaining weight-reduction which results from forming the missing-arm portions 68.

As mentioned above, preferably, the total number (e.g., three) of the third sprocket arms 61 is equal to the total number (e.g., three) of the second sprocket arms 51 as in the illustrated embodiment. Preferably, at least one of the third sprocket arms 61 is aligned with the missing-arm portion 58 of the second sprocket 12 in the assembled state so as to avoid sacrificing rigidity while effectively attaining weight-reduction which results from forming the missing-arm portions 58. More preferably, all of the third sprocket arms 61 are aligned with a corresponding one of the missing-arm portions 58 of the second sprocket 12 in the assembled state. Also preferably each of the second sprocket arms 51 is aligned with a corresponding one of the missing-arm portion 68 of the third sprocket 13 in the assembled state so as to avoid sacrificing rigidity while effectively attaining weight-reduction which results from forming the missing-arm portions 68. It is also preferable that all of the second sprocket arms 51 are aligned with a corresponding one of the missing-arm portions 68 of the third sprocket 13 in the assembled state.

The third chain engaging portion 62 also includes a plurality of third teeth 69 on its outer peripheral edge for engaging a chain (not shown) in a conventional manner. The third chain engaging portion 62 has a total number (e.g., twenty-four) of the third teeth 69 that is less than the total number (e.g., thirty-two) of the first teeth 49 and the total number (e.g., twenty-eight) of the second teeth 59.

As best seen in FIG. 9, the first axial spacer 21 has a first spacer mounting portion 70 and a plurality of first spacer arms 71 extending radially from the first spacer mounting portion 70. In the case of the first axial spacer 21, the first spacer arms 71 are preferably integrally formed with the first spacer mounting portion 70 as a one-piece, unitary member. The first spacer mounting portion 70 has a partially splined opening 73 for mounting on rear hub (not shown) and three fastener receiving holes 74 for receiving the inner rivets 31, respectively. The partially splined opening 73 is configured to be fixedly mounted on splines of a freewheel (not shown) of a rear hub (not shown) in a relatively conventional manner. Preferably, the partially splined opening 73 is configured so that first axial spacer 21 can only fit on the freewheel (not shown) in a single orientation. In other words, the orientation of the first axial spacer 21 is configured and dimensioned such that the first axial spacer 21 has only one proper orientation with respect to the sprockets 11 to 18.

Each of the first spacer arms 71 has a fastener receiving hole 75 in the form of a slot for receiving either the middle rivets 32 or the outer rivets 33, respectively. The first spacer arms 71 are dimensioned in a circumferential direction of the bicycle sprocket assembly 10 to support the first and second sprocket arms 41 and 51. In particular, each of the first spacer arms 71 has a circumferential width or dimension W4 along a majority of its length from the first spacer mounting portion 70 to its free end. The circumferential widths W4 of the first spacer arms 71 are dimensioned so that the circumferential widths W1 and W2 of the first and second sprocket arms 41 and 51 are smaller than the circumferential widths W4 of the first spacer arms 71. Since the circumferential widths W4 of the First spacer arms 71 are larger than the circumferential widths W1 and W2 of the first and second sprocket arms 41 and 51, the bicycle sprocket assembly 10 can be lighter than a conventional bicycle sprocket assembly that uses spacers without radially extending spacer arms. Thus, the sprocket openings 47 and 57 of the first and second sprockets 11 and 12 between the first and second sprocket arms 41 and 51 are enlarged for weight-reduction of the first and second sprockets 11 and 12, while the first and second sprocket arms 41 and 51 maintain the rigidity of the first and second sprockets 11 and 12 due to the presence of the first spacer arms 71. In this way, a weight-reduction of the bicycle sprocket assembly 10 can be attained without sacrificing rigidity of the bicycle sprocket assembly 10.

As best seen in FIG. 10, the second axial spacer 22 has a second spacer mounting portion 80 and a plurality of second spacer arms 81 extending radially from the second sprocket mounting portion 50. In the case of the second axial spacer 22, the second spacer arms 81 are preferably integrally formed with the second spacer mounting portion 80 as a one-piece, unitary member. The second spacer mounting portion 80 has a partially splined opening 83 for mounting on rear hub (not shown) and three fastener receiving holes 84 for receiving the inner rivets 31, respectively. The partially splined opening 83 is configured to be fixedly mounted on splines of a freewheel (not shown) of a rear hub (not shown) in a relatively conventional manner. Preferably, the partially splined opening 83 is configured so that second axial spacer 22 can only fit on the freewheel (not shown) in a single orientation. In other words, the orientation of the second axial spacer 22 is configured and dimensioned such that the second axial spacer 22 has only one proper orientation with respect to the sprockets 11 to 18.

Each of the second spacer arms 81 has a fastener receiving hole 85 in the form of a slot for receiving the middle rivets 32, respectively. The second spacer arms 81 are dimensioned in a circumferential direction of the bicycle sprocket assembly 10 to support the second and third sprocket arms 51 and 61. In particular, each of the second spacer arms 81 have a circumferential width or dimension W5 along a majority of its length from the second spacer mounting portion 80 to its free end.

The circumferential widths W5 of the second spacer arms 81 are dimensioned so that the circumferential widths W2 and W3 of the second and third sprocket arms 51 and 61 are smaller than the circumferential widths W5 of the second spacer arms 81. Since the circumferential widths W5 of second spacer arms 81 are larger than the circumferential widths W2 and W3 of the second and third sprocket arms 51 and 61, the bicycle sprocket assembly 10 can be lighter than a conventional bicycle sprocket assembly that uses spacers without radially extending spacer arms. Thus, the sprocket openings 57 and 67 of the second and third sprockets 12 and 13 between the second and third sprocket arms 51 and 61 are enlarged for weight-reduction of the second and third sprockets 12 and 13, while the second and third sprocket arms 51 and 61 maintain the rigidity of the second and third sprockets 12 and 13 due to the presence of the second spacer arms 81. In this way, a weight-reduction of the bicycle sprocket assembly 10 can be attained without sacrificing rigidity of the bicycle sprocket assembly 10.

Figure 12:
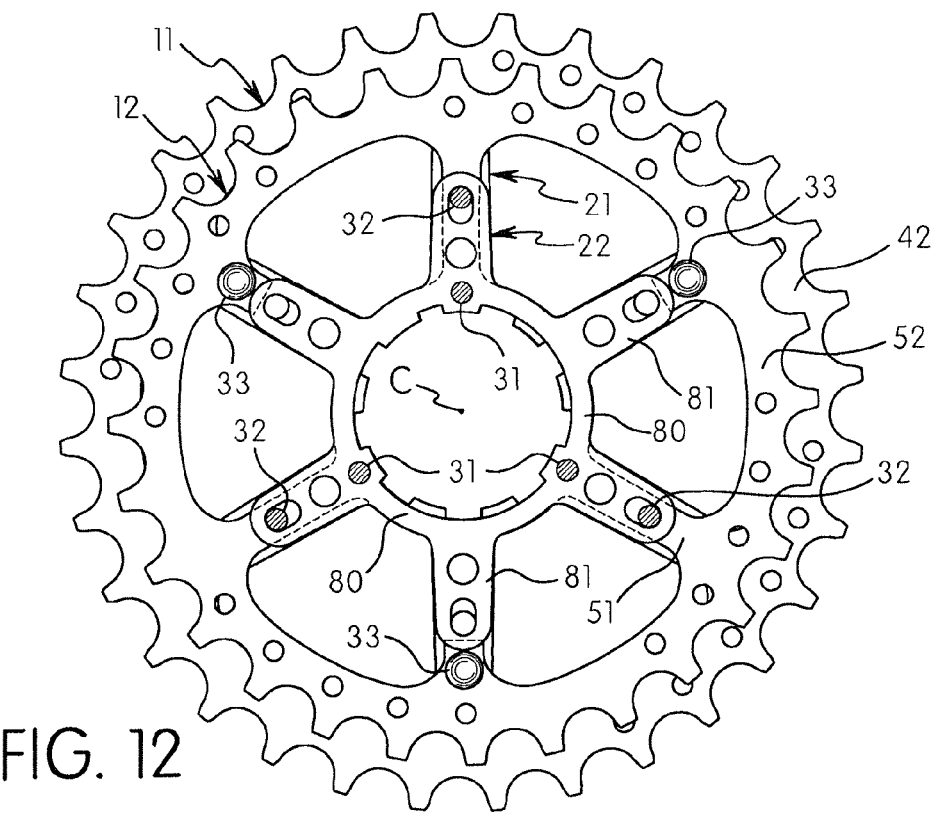
FIG. 12 is a side elevational view of the two largest sprockets and the first and second axial spacers of the bicycle sprocket assembly illustrated in FIGS. 1 to 5 as viewed from the small sprocket facing side of the sprockets.
Figure 13:
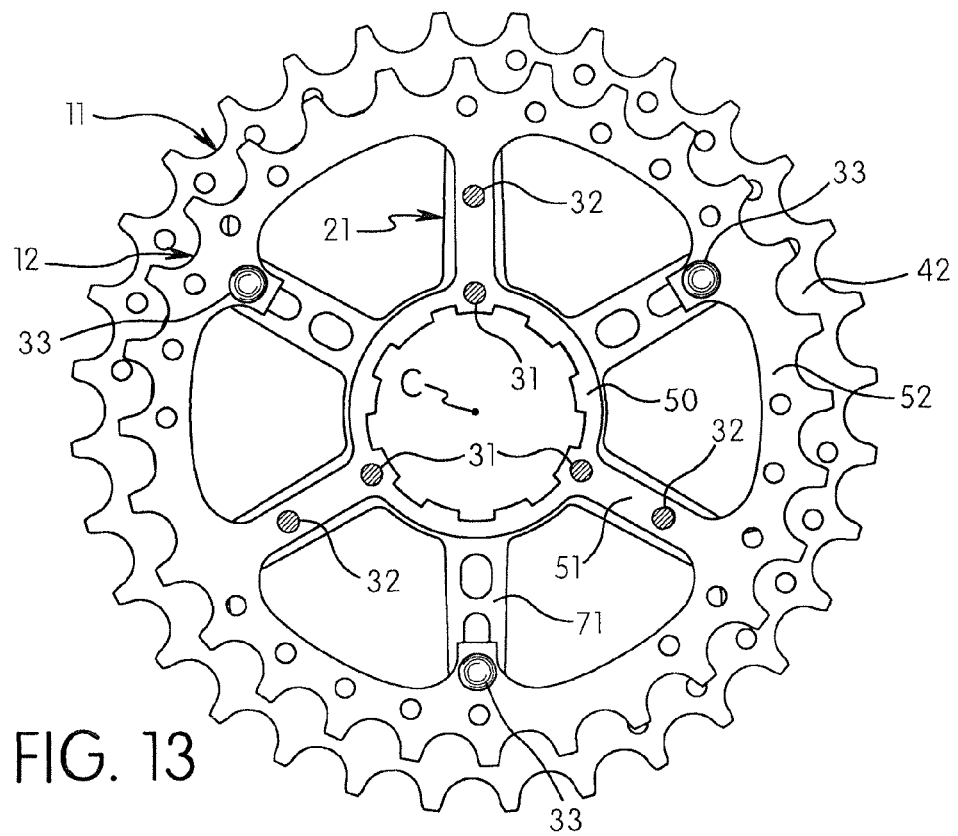
FIG. 13 is a side elevational view of the two largest sprockets and the first axial spacer of the bicycle sprocket assembly illustrated in FIGS. 1 to 5 as viewed from the small sprocket facing side of the sprockets.
Figure 14:
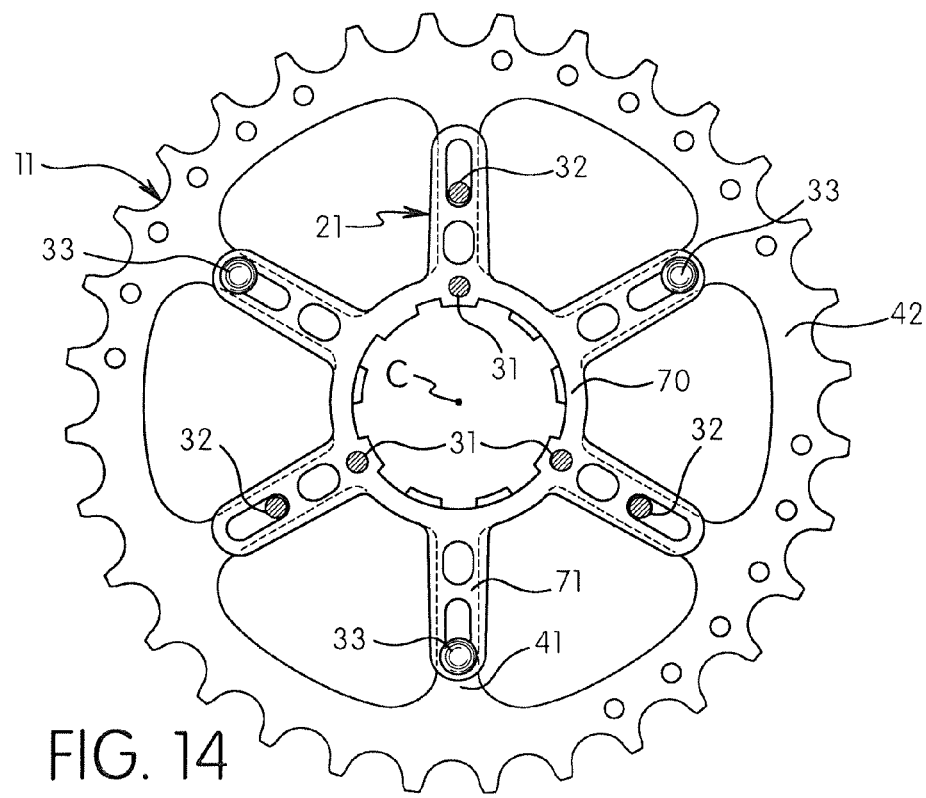
FIG. 14 is a side elevational view of the largest sprocket and the first axial spacer of the bicycle sprocket assembly illustrated in FIGS. 1 to 5 as viewed from the small sprocket facing side of the sprocket.
Figure 15:
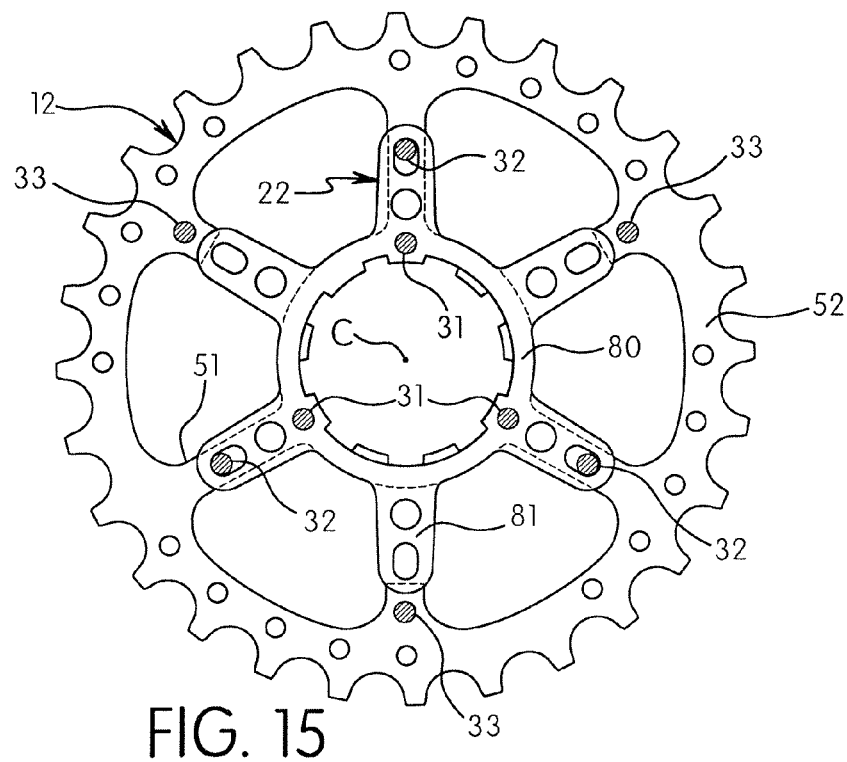
FIG. 15 is a side elevational view of the second sprocket (the sprocket next to the largest sprocket) and the second axial spacer of the bicycle sprocket assembly illustrated in FIGS. 1 to 5 as viewed from the small sprocket facing side of the sprocket.

Referring now to FIGS. 11 to 15, the dimensional relationships between the axial spacers 21 and 22 and the first and third sprockets 11 to 13 will now be discussed in more detail. FIG. 11 shows the dimensional relationships in the circumferential direction between the axial spacers 21 and 22 and the first and third sprockets 11 to 13 as viewed from the small sprocket facing side (e.g., a first sprocket side surface). As seen in FIG. 11, the second axial spacer 22 is partially visible while the third sprocket arms 61 of the third sprocket 13 overlies the second axial spacer 22 as viewed from the small sprocket facing side of the sprockets 11 to 13. As seen in FIGS. 12 and 15, the second axial spacer 22 completely covers the second sprocket arm 51 of the second sprocket 12 over the majority of its length as viewed from the small sprocket facing side of the sprockets 11 and 12. In other words, the second spacer arms 81 are partially visible from an axial view of a second sprocket side surface of the second sprocket 12 so that the circumferential widths of the second sprocket arms 51 of the second sprocket 12 can be smaller than the conventional structures to attain weight-reduction without sacrificing rigidity. As seen in FIG. 13, the first axial spacer 21 is partially visible while the second sprocket arms 51 of the second sprocket 12 overlies the first axial spacer 21 as viewed from the small sprocket facing side of the sprockets 11 to 13. As seen in FIG. 14, the first axial spacer 21 completely covers the first sprocket arm 41 of the first sprocket 11 over the majority of its length as viewed from the small sprocket facing side of the first sprocket 11. In other words, the first spacer arms 71 are partially visible from an axial view of a second sprocket side surface of the first sprocket 11 so that the circumferential widths of the first sprocket arms 41 of the first sprocket 11 can be smaller than the conventional structures to attain weight-reduction without sacrificing rigidity.

To better understand the above description of the sprocket assembly 10, some of the terms will now be further explained for the sake of clarity. As used herein, the term "smaller sprocket" refers to a sprocket having a smaller diameter with respect to the claimed sprocket and the term "larger sprocket" refers to a sprocket having a larger diameter with respect to the sprocket in question. As used herein, the term "smaller sprocket facing side surface" refers to a side surface of the sprocket in question that faces a sprocket having a smaller diameter with respect to the sprocket in question and the term "larger sprocket facing side surface" refers to a side surface of the sprocket in question that faces a sprocket having a larger diameter with respect to the sprocket in question. As used herein, the term "adjacent sprocket" refers to an immediate adjacent sprocket to a sprocket in question with no intervening sprockets located between the "adjacent sprocket" and the sprocket in question. The absence of the use of the modifying term "at least one" before another term should not be construed to preclude additional ones of the modified terms.

While only selected embodiments have been chosen to illustrate the sprocket assembly 10, it will be apparent to those skilled in the art from this disclosure that various changes and modifications can be made herein without departing from the scope of the invention as defined in the appended claims. For example, the size, shape, location or orientation of the various components can be changed as needed and/or desired. Also for example, instead of making the sprocket arms 41 and 51 narrower in width, the first and second sprocket arms 41 and 51 can have radial openings in order to reduce the weight of the first and second sprockets 11 and 12. Components that are shown directly connected or contacting each other can have intermediate structures disposed between them, unless otherwise specified. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle sprocket assembly comprising:
    a first sprocket including an annular first sprocket mounting portion, a plurality of first sprocket arms extending radially outward from the first sprocket mounting portion and a first chain engaging portion disposed on radial outer ends of the first sprocket arms, the first chain engaging portion including a plurality of first teeth; and
    a first axial spacer disposed on a first sprocket side surface of the first sprocket, the first axial spacer having a first spacer mounting portion and a plurality of first spacer arms extending radially from the first spacer mounting portion, the first spacer arms being partially visible from an axial view of a second sprocket side surface that faces in an opposite direction from the first sprocket side surface, the first spacer mounting portion and the plurality of first spacer arms forming a one-piece, unitary member.

2. The bicycle sprocket assembly according to claim 1, wherein
    the first spacer arms have circumferential widths extending in a circumferential direction of the bicycle sprocket assembly so that the circumferential widths of the first spacer arms are larger than circumferential widths of the first sprocket arms at a corresponding radial position along the radial direction of each of the first spacer arms.

3. The bicycle sprocket assembly according to claim 1, further comprising
    a second sprocket including a second sprocket mounting portion, a plurality of second sprocket arms extending radially from the second sprocket mounting portion and a second chain engaging portion disposed on radial outer ends of the second sprocket arms, the second chain engaging portion including a plurality of second teeth, the second chain engaging portion having a total number of the second teeth being less than a total number of the first teeth, the first axial spacer being disposed between the first and second sprockets.

4. A bicycle sprocket assembly comprising:

a first sprocket including a first sprocket mounting portion, a plurality of first sprocket arms extending radially from the first sprocket mounting portion and a first chain engaging portion disposed on radial outer ends of the first sprocket arms, the first chain engaging portion including a plurality of first teeth;

a second sprocket including a second sprocket mounting portion, a plurality of second sprocket arms extending radially from the second sprocket mounting portion and a second chain engaging portion disposed on radial outer ends of the second sprocket arms, the second chain engaging portion including a plurality of second teeth, the second chain engaging portion having a total number of the second teeth being less than a total number of the first teeth;

a first axial spacer disposed on a first sprocket side surface of the first sprocket between the first sprocket and the second sprocket, the first axial spacer having a first spacer mounting portion and a plurality of first spacer arms extending radially from the first spacer mounting portion, the first spacer arms being partially visible from an axial view of a second sprocket side surface that faces in an opposite direction from the first sprocket side surface;

a third sprocket including a third sprocket mounting portion, a plurality of third sprocket arms extending radially from the third sprocket mounting portion and a third chain engaging portion disposed on radial outer ends of the third sprocket arms, the third chain engaging portion including a plurality of third teeth, the third chain engaging portion having a total number of the third teeth being less than the total number of the second teeth; and a second axial spacer disposed between the second and third sprockets, the second axial spacer having an annular second spacer mounting portion and a plurality of second spacer arms extending radially outward from the second spacer mounting portion.

5. The bicycle sprocket assembly according to claim 4, wherein the second spacer arms have circumferential widths extending in a circumferential direction of the bicycle sprocket assembly so that the circumferential widths of the second spacer arms are larger than circumferential widths of the second sprocket arms at a corresponding radial position along the radial direction of each of the second spacer arms.

6. The bicycle sprocket assembly according to claim 4, further comprising additional sprockets that are smaller than the first, second and third sprockets with the first sprocket having a largest maximum diameter in the bicycle sprocket assembly.

7. A bicycle sprocket assembly comprising:

a first sprocket including a first sprocket mounting portion, a plurality of first sprocket arms extending radially from the first sprocket mounting portion and a first chain engaging portion disposed on radial outer ends of the first sprocket arms, the first chain engaging portion including a plurality of first teeth;

a second sprocket including a second sprocket mounting portion, a plurality of second sprocket arms extending radially from the second sprocket mounting portion and a second chain engaging portion disposed on radial outer ends of the second sprocket arms, the second chain engaging portion including a plurality of second teeth, the second chain engaging portion having a total number of the second teeth being less than a total number of the first teeth; and a first axial spacer disposed on a first sprocket side surface of the first sprocket between the first sprocket and the second sprocket, the first axial spacer having a first spacer mounting portion and a plurality of first spacer arms extending radially from the first spacer mounting portion, the first spacer arms being partially visible from an axial view of a second sprocket side surface that faces in an opposite direction from the first sprocket side surface, the second sprocket including a total number of the second sprocket arms that is less than a total number of the first sprocket arms of the first sprocket.

8. The bicycle sprocket assembly according to claim 4, wherein the second sprocket includes a total number of the second sprocket arms that is less than a total number of the first sprocket arms of the first sprocket.

9. The bicycle sprocket assembly according to claim 8, wherein the third sprocket include a total number of the third sprocket arms that is less than the total number of the first sprocket arms of the first sprocket.

10. The bicycle sprocket assembly according to claim 4, wherein the second sprocket includes a total number of the second sprocket arms that is less than a total number of the first sprocket arms of the first sprocket so that the second sprocket has at least one missing-arm portion, the third sprocket includes a total number of the third sprocket arms of the third sprocket that is less than the total number of the first sprocket arms of the first sprocket so that the third sprocket has at least one missing-arm portion, and at least one of the second sprocket arms is aligned with the missing-arm portion of the third sprocket and at least one of the third sprocket arms is aligned with the missing-arm portion of the second sprocket in an assembled state.

11. The bicycle sprocket assembly according to claim 10, wherein each of the second and third sprockets has a plurality of the missing-arm portions, respectively, and the second sprocket arms are aligned with the missing-arm portions of the third sprocket, and the third sprocket arms are aligned with the missing-arm portions of the second sprocket in the assembled state.

12. The bicycle sprocket assembly according to claim 11, wherein the second sprocket arms and the missing-arm portions of the second sprocket alternate with respect to each other in a circumferential direction of the bicycle sprocket assembly, and the third sprocket arms and the missing-arm portions of the third sprocket alternate with respect to each other in the circumferential direction of the bicycle sprocket assembly.

13. A bicycle sprocket assembly comprising:

a first sprocket including a first sprocket mounting portion, a plurality of first sprocket arms extending radially from the first sprocket mounting portion and a first chain engaging portion disposed on radial outer ends of the first sprocket arms, the first chain engaging portion including a plurality of first teeth;

a second sprocket including a second sprocket mounting portion, a plurality of second sprocket arms extending radially from the second sprocket mounting portion and a second chain engaging portion disposed on radial outer ends of the second sprocket arms, the second chain engaging portion including a plurality of second teeth, the second chain engaging portion having a total number of the second teeth being less than a total number of the first teeth; and a third sprocket including a third sprocket mounting portion, a plurality of third sprocket arms extending radially from the third sprocket mounting portion and a third chain engaging portion disposed on radial outer ends of the third sprocket arms, the third chain engaging portion including a plurality of third teeth, the third chain engaging portion having a total number of the third teeth being less than a total number of the second teeth;

the second sprocket including a total number of the second sprocket arms that is less than a total number of the first sprocket arms of the first sprocket so that the second sprocket has at least one missing-arm portion, the third sprocket including a total number of the third sprocket arms of the third sprocket that is less than the total number of the first sprocket arms of the first sprocket so that the third sprocket has at least one missing-arm portion, and at least one of the second sprocket arms being aligned with the missing-arm portion of the third sprocket, and at least one of the third sprocket arms being aligned with the missing-arm portion of the second sprocket in the assembled state.

14. The bicycle sprocket assembly according to claim 13, wherein each of the second and third sprockets has a plurality of the missing-arm portions, respectively.

15. The bicycle sprocket assembly according to claim 14, wherein the second sprocket arms are aligned with the missing-arm portions of the third sprocket, and the third sprocket arms are aligned with the missing-arm portions of the second sprocket in an assembled state.

16. The bicycle sprocket assembly according to claim 15, wherein the second sprocket arms and the missing-arm portions of the second sprocket alternate with respect to each other in a circumferential direction of the bicycle sprocket assembly, and the third sprocket arms and the missing-arm portions of the third sprocket alternate with respect to each other in the circumferential direction of the bicycle sprocket assembly.

17. The bicycle sprocket assembly according to claim 13, further comprising a first axial spacer disposed between the first and second sprockets and on a first sprocket side surface of the first sprocket that faces the second sprocket, the first axial spacer having a first spacer mounting portion and a plurality of first spacer arms extending radially from the first spacer mounting portion, the first spacer arms being partially visible from an axial view of a second sprocket side surface that faces in an opposite direction from the first sprocket side surface.

18. The bicycle sprocket assembly according to claim 17, wherein the first spacer arms having circumferential widths extending in a circumferential direction of the bicycle sprocket assembly so that the circumferential widths of the first spacer arms are larger than circumferential widths of the first sprocket arms at a corresponding radial position along the radial direction of each of the first spacer arms.

19. The bicycle sprocket assembly according to claim 18, further comprising a second axial spacer disposed between the second and third sprockets, the second axial spacer having a second spacer mounting portion and a plurality of second spacer arms extending radially from the second spacer mounting portion, the second spacer arms having circumferential widths extending in a circumferential direction of the bicycle sprocket assembly so that the circumferential widths of the second spacer arms are larger than circumferential widths of the second sprocket arms at a corresponding radial position along the radial direction of each of the second spacer arms.

20. The bicycle sprocket assembly according to claim 19, further comprising additional sprockets that are smaller than the first, second and third sprockets with the first sprocket having a largest maximum diameter in the bicycle sprocket assembly.

21. The bicycle sprocket assembly according to claim 13, wherein the first sprocket mounting portion is an annular portion having the first sprocket arms extending radially outward therefrom.

* * * * *